United States Patent [19]

Peterson

[11] 3,839,052

[45] Oct. 1, 1974

[54] PROTECTIVE COATINGS CONTAINING ORGANOTIN COMPOUNDS

[75] Inventor: Donald J. Peterson, Springfield Twp., Hamilton County, Ohio

[73] Assignee: The Procter & Gamble Company, Cincinnati, Ohio

[22] Filed: Dec. 3, 1971

[21] Appl. No.: 208,024

Related U.S. Application Data

[63] Continuation-in-part of Ser. No. 158,527, June 30, 1971, abandoned.

[52] U.S. Cl.................. 106/15 AF, 71/67, 106/18, 106/243, 117/151, 424/288
[51] Int. Cl.......................... C09d 5/14, C09d 5/16
[58] Field of Search................... 106/15 AF, 16–18; 117/151; 424/288; 260/429.7; 71/2, 7, 3

[56] References Cited
UNITED STATES PATENTS

| | | | |
|---|---|---|---|
| 2,957,785 | 10/1960 | Leatherland............... | 106/15 AF X |
| 3,211,680 | 10/1965 | Updegraff et al........... | 106/15 AF X |
| 3,234,032 | 2/1966 | Leebrick et al. ............... | 106/15 AF |
| 3,365,479 | 1/1968 | Lefort............................ | 260/429.7 |
| 3,440,255 | 4/1969 | Matsuda et al.................. | 260/429.7 |

OTHER PUBLICATIONS

Chemical Abstracts, Vol. 62, page 11844d; QD A85.

*Primary Examiner*—Joan B. Evans Welcome
*Attorney, Agent, or Firm*—Jack D. Schaeffer; Richard C. Witte; Thomas H. O'Flaherty

[57] ABSTRACT

Compositions and processes for preventing marine fouling and preserving wood employing certain (organothiomethyl)-triorganotin, (organosulfonylmethyl) triorganotin and (N,N-disubstituted aminomethyl)triorganotin compounds.

2 Claims, No Drawings

PROTECTIVE COATINGS CONTAINING ORGANOTIN COMPOUNDS

CROSS REFERENCE TO RELATED APPLICATION

This application is a continuation-in-part of the now abandoned application Ser. No. 158,527, filed June 30, 1971.

BACKGROUND OF THE INVENTION

This invention relates to compositions and processes for preventing the build-up of plant, animal and microbial encrustations on surfaces and for preserving wood utilizing organotin compounds of the type hereinafter disclosed. Surfaces treated in the manner of this invention remain free from biological encrustations, and wood so treated remains well preserved after exposure to a variety of decay causing environments. Surfaces so treated have high paintability.

The necessity for applying various preservatives to wood to prevent decay or "rot" is clearly accepted and several million pounds of wood perservatives are used industrially each year. Untreated wood is subject to a variety of decay and rot causing influences including damage by bacterial and fungal infestation and damage by insects, especially termites. Furthermore, in water certain marine animals bore into wood and cause serious damage. Various rodents gnaw on wood and thereby cause rapid deterioration. For these reasons, wood preservatives should be capable of destroying or repelling a wide variety of organisms and microorganisms, including bacteria, fungi, insects, mollusks and rodents.

A variety of chemicals are commonly used as wood preservatives, including such well-known substances as creosote and pentachlorophenol. Combinations of toxic materials such as FCAP (Fluoride-Chromate-Arsenate-Dinitrophenol) are also used for this purpose. However, many of the heretofore used wood preservatives suffer from various shortcomings. For example, wood treated with creosote has essentially no paintability. Wood treated with some of the more toxic wood preservatives is not suitable in barnyard lots where cattle can gnaw the wood. Some wood preservatives are sensitizers and cannot be used for treating bleachers and seats. For these and other reasons, there is a continuing need for new and improved wood preservatives agents.

At the same time, surfaces other than wood require protective coatings, especially when said surfaces are in contact with marine environment such that buildup of various biological encrustations becomes a problem. For example, it is well known that barnacles, encrusting bryozoans, various algal forms, bugula, hydroids, oysters, tunicates, tube worms and ill-defined slime films comprising a mixed microorganism population attach themselves to concrete, wood and metal pier pilings, ship bottoms and the like. Removal of such films requires expensive mechanical scraping or sandblasting. Although a variety of chemical paint additives and coatings suitable for preventing the buildup of such encrustations are known in the art, these materials all suffer from a variety of disadvantages. For example, cuprous oxide, a common anti-fouling paint additive, must be used at extremely high levels, up to about 50 percent by weight of the anti-fouling composition, thereby limiting the types of formulations that can be prepared. The mercury anti-fouling compositions well known in the art are more toxic than copper oxide and pose potential ecological problems. Furthermore, many such mercury derivatives are corrosive to light metal alloys such as aluminum and must be avoided when aluminium ship bottoms are being treated. Organotin compounds, especially bis(tri-n-butyltin)oxide, have been used as anti-fouling additives for coating compositions. However, coating compositions containing the organotin oxides need to be re-applied periodically after immersion in a marine environment. For this reason, a continuing search has been made to provide suitable organotin compounds having improved and prolonged anti-fouling activity.

Accordingly, it is an object of this invention to provide a method for preserving wood (including fibreboard and compacted cellulosic wood substitutes) by applying one or more of certain (organothiomethyl)triorganotin, (organosulfonylmethyl)triorganotin and (N,N-disubstituted aminomethyl)triorganotin compounds thereto. Another object herein is to provide improved anti-fouling compositions especially suitable for use on metal, wood, concrete and the like, surfaces exposed to a marine environment. These and other objects are obtained herein as will be seen from the following disclosure.

The organotin compounds used herein as well as methods for their preparation are fully described in the co-pending Peterson applications Ser. No. 23,019, filed Mar. 26, 1970, now U.S. Pat. No. 3,723,089, issued Mar. 27, 1973; Ser. No. 23,457, filed Mar. 27, 1970, now U.S. Pat. No. 3,725,446, issued Apr. 3, 1973; Ser. No. 158,528, filed June 1971, now U.S. Pat. No. 3,794,670, issued Feb. 26, 1974; and Ser. No. 164,941, filed July 21, 1971, now U.S. Pat. No. 3,784,580, issued Jan. 8, 1974, which is a continuation-in-part of Ser. No. 10,303, now abandoned, incorporated herein by reference.

SUMMARY OF THE INVENTION

The present invention encompasses compositions and a method for preserving wood comprising applying an effective amount of one or more organotin compounds of the types hereinafter described to said wood. By common usage, the term "preserving wood" has come to connote the treatment of wood with chemicals to prevent its destruction by living organisms. A further connotation includes the prevention of the development of certain fungi in wood which do not destroy the wood but which cause unsightly stains on the surface thereof and thereby degrade the lumber (the common "sap-stain" organisms). Wood treated in the manner of this invention is substantially protected from damage by bacteria, fungi, algae, and insects (especially termites), and repels woodpeckers, rodents and the like. In addition the compositions and processes herein are useful for preventing the accumulation and encrustation of marine organisms on all manner of surfaces, including wood, iron, steel, aluminum, various metal alloys, concrete, fibreglass and the like. Furthermore, the compounds and compositions herein are suitable for use as an aid in removing such marine accumulations and encrustations from all manner of surfaces. Compositions suitable for such use are called "anti-fouling" compositions.

DETAILED DESCRIPTION OF THE INVENTION

According to the present method, the destruction of wood by any of the aforementioned destructive agents is prevented by applying an effective amount of certain organotin compounds of the type hereinafter disclosed to the wood. It will be recognized that, in its broader aspects, the invention also encompasses the protection of various cellulosic wood substitutes such as fibreboard and other compacted cellulosic materials. The term "applying to wood" herein encompasses brushing, spraying, dipping, and otherwise coating the wood with the organotin compounds. The term also encompasses the well-known pressure and thermal methods for applying or impregnating wood preservatives. A variety of suitable methods for applying wood preservatives are discussed in Hunt and Garratt, "Wood Preservation," second ed. McGraw-Hill, New York (1953) and all such methods are useful herein. A more general discussion of various application methods is found in Torgenson (ed.) "Fungicides," Academic Press, New York (1967) at Chapter 11. As will be more fully disclosed hereinafter, the practice of this invention provides an effective method of wood preservation. In addition, wood treated with the organotin compounds herein has a high paintability and contains no highly toxic residues.

The use of the compositions and processes herein to prevent marine fouling of surfaces also comprises applying an effective amount of one or more of the organotin compounds described below to the surface by spraying, brushing, dipping and the like. When compositions containing the organotin compounds are used to aid in the removal of marine encrustations, they are conveniently sprayed onto the fouled surface prior to a final "scraping" (a term which includes sandblasting) operation.

The method of surface treatment of this invention encompasses applying to the surface an effective amount of an organotin compound selected from the group consisting of (organothiomethyl)triorganotin compounds, (organosulfonylmethyl)-triorganotin compounds, (N,N-disubstituted aminomethyl)-triorganotin compounds and mixtures thereof. The (organothiomethyl)-triorganotin compounds suitable for use herein are more fully described in the copending application of Peterson, "Novel Organotin Herbicidal Compounds" (above), incorporated herein by reference. These compounds are of the formula R—S—CH$_2$—SnR$^1_3$ wherein R is alkyl of from one to 14 carbon atoms; aryl; or substituted aryl; and each R$^1$ is alkyl of from one to 14 carbon atoms and are prepared by reacting an organometallic compound of the formula R—S—CH$_2$M wherein M is alkali metal with a trialkyltin halide of the formula R'SnX wherein X is halide.

The (organosulfonylmethyl)triorganotin compounds useful in the present process are more fully described in the copending application of Peterson, entitled "Novel Organo-tin Compounds" (above), incorporated herein by reference. These compounds are of the general formula

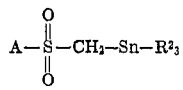

Organotin wherein A is alkyl of from one to 14 carbon atoms; aryl; substituted aryl; or R$_2^3$N— wherein each R$^3$ is alkyl of from one to 14 carbon atoms; and each R$^2$ is alkyl of one to 14 carbon atoms; or aryl. The compounds are prepared by reacting an organometallic compound having the formula:

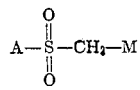

wherein M is alkali metal with a trihydrocarbyltin halide.

The (N,N-disubstituted aminomethyl)triorganotin compounds useful herein are more fully described in U.S. Pat. No. 3,723,089 issued Mar. 27, 1973, incorporated herein by reference. These aminomethyltin compounds are of the general formula R$_2^4$NCH$_2$SnR$_3^5$ and R$^6$R$_2^{4+}$NCH$_2$SnR$_3^5$X$^-$ wherein each R$^4$ is a straight or branched chain, saturated or unsaturated aliphatic group having from one carbon atom to about 14 carbon atoms, or both R$^4$'s taken together form a heterocyclic ring containing four to seven carbons, R$^5$ is a straight or branched chain, saturated or unsaturated aliphatic group having from one to about 14 carbon atoms, R$^6$ is hydrogen or a straight or branched chain, saturated or unsaturated aliphatic group having from one to about 14 carbon atoms, and X is a salt forming anion, e.g., halide. The aforementioned organotin compounds are prepared from triorganotin halides and certain organometallic compounds in the manner fully described in the foregoing Peterson applications.

Exemplary (organothiomethyl)triorganotin compounds suitable for use as anti-fouling agents and wood preservatives in the manner of the present invention include (methylthiomethyl)-tributylin, (phenylthiomethyl)tributyltin, (decylthiomethyl)-tributyltin, (naphthylthiomethyl)tributyltin, (methylthiomethyl)trimethyltin, (p-tolylthiomethyl)tributyltin, (methylthiomethyl)-tridecyltin, (decylthiomethyl)tridecyltin and the like. Exemplary (organosulfonylmethyl)triorganotin compounds suitable for use as anti-fouling agents and wood preservatives include (phenylsulfonylmethyl)tributyltin, (phenylsulfonylmethyl)triphenyltin, (p-methoxyphenylsulfonylmethyl)tributyltin, (decylsulfonylmethyl)tributyltin, (decylsulfonylmethyl)-triphenyltin, (methylsulfonylmethyl)trimethyltin, (naphthylsulfonylmethyl)tridecyltin, (N,N-dimethylaminosulfonylmethyl) and the like. Exemplary (N,N-disubstituted aminomethyl)triorganotin compounds suitable for use as anti-fouling agents and wood preservatives include (N,N-dimethylaminomethyl)-tributyltin, (cyclopentamethylenaminomethyl)tributyltin (N,N-diethylaminomethyl)triisopropyltin, (N,N-diisopentylaminomethyl)tripropyltin, (N,N-dibutylaminomethyl)trioctyltin, (N,N-dihexylaminomethyl)-tridodecyltin, (N,N-didodecylaminomethyl)trihexyltin, (N,N-diethylaminomethyl)tri(3-pentenyl)tin, (N,N-dipropylaminomethyl)triethyltin and the like. Organotin compounds preferred for use as anti-fouling agents and wood preservatives in the manner of this invention are (phenylsulfonylmethyl)tributyltin, (methylthiomethyl)tributyltin, (N,N-dimethylaminomethyl)tributyltin and (phenylthiomethyl)tributyltin.

The triorganotin compounds used in the manner of this invention can be applied to the surface being treated alone, but are preferably applied in combination with various carrier materials, said carriers serving both as diluents and as penetrants for carrying the tin compounds into the interstices of the treated surface. Preferably, the carriers suitable for use in the present process are inexpensive non-staining materials capable of solubilizing the triorganotin compounds. Suitable carrier materials herein include, for example, the chlorinated hydrocarbons such as trichloroethylene, chlorobenzene, propylene chloride, alkyl and aromatic hydrocarbons such as benzene, toluene, xylene, hexane, decane, and mixtures thereof such as the petroleum ethers, kerosenes and naphtha fractions. Creosote can also be employed, but the resulting treated surfaces are not paintable. Any of the non-aqueous carriers commonly used for anti-fouling compounds and wood preservatives can also be used herein. Such nonaqueous carriers are commonly "extended" with water prior to use. Various film-forming carriers such as drying oils commonly employed as paint bases, for example, rapeseed oil, linseed oil, dehydrogenated soybean oil, turpentine fractions and the like as well as commercial film-forming latex and polymer-based paint vehicles are preferred carriers herein. Epoxy resin paint bases are especially preferred carriers of the anti-fouling compounds herein and come within the definition of preferred "film forming" carriers.

The organotin compounds used in the present process are dispersible in water or are soluble in the common organic solvents such as kerosene, xylene, Stoddard Solvent, acetone, and the like, and can be applied directly from these carriers. Such suspensions and solutions can be dispersed under super-atmospheric pressure as aerosols. Other liquid anti-fouling and wood preservative compositions suitable for the practice of this invention are emulsifiable concentrates which comprise the organotin compound, an emulsifier, and, as an inert carrier, an organic solvent of the type disclosed above. Such concentrates can be extended with water and/or oil to any desired concentration of the organotin compound for application to the surface being treated. The emulsifiers used in these concentrates are surface active agents of the anionic, nonionic, cationic, ampholytic or zwitterionic type and normally comprise from about 0.1 to 30 percent by weight of the concentrate. Examples of suitable anionic surface active agents are sodium salts of fatty alcohol sulfates having from eight to 18 carbon atoms in the fatty chain and sodium salts of alkyl benzene sulfonates, having from nine to 15 carbon atoms in the alkyl chain. Examples of suitable nonionic surface active agents are the polyethylene oxide condensates of alkyl phenols, wherein the alkyl chain contains from about six to 12 carbon atoms and the amount of ethylene oxide condensed onto each mole of alkyl phenol is from about 5 to 25 moles. Examples of suitable cationic surface active agents are dimethyl dialkyl quaternary ammonium salts wherein the alkyl chains contain from about eight to 18 carbon atoms and the salt forming anion is a halogen. Examples -(N,N-dimethyl-N-hexadeclyammonio)propane- of suitable ampholytic surface active agents are derivatives of aliphatic secondary or tertiary amines in which one of the aliphatic substituents contains from about eight to 18 carbon atoms and one contains an anionic water solubilizing group, e.g., sulfate or sulfonate.

Examples of suitable zwitter-ionic surface active agents are derivatives of the aliphatic quaternary ammonium compounds in which one of the aliphatic substituents contains from about eight to 18 carbon atoms and one contains an anionic water solubilizing group. Specific examples of zwitterionic surface active agents are 3(N,N-dimethyl 1-sulfonate and 3-(N,N-dimethyl-N-hexadecylammonio)-2-hydroxy propane-1-sulfonate. Many other suitable surface active agents are described in "Detergents and Emulsifiers — 1969 Annual," by John W. McCutcheon Inc., which is incorporated herein by reference.

From the foregoing it may be seen that the organotin compounds of the types hereinabove disclosed can be dissolved or dispersed in various carriers and applied to the surface being treated by brushing, spraying, soaking or by any of the well-known pressure or thermal methods commonly employed with wood preservatives. Since the organotin compounds are highly paintable, the treated surface can be painted with water base, oil base, latex base or epoxy resin base paint following treatment. Alternatively, the organotin compound is admixed with the paint composition and applied to the surface conjointly therewith. In a preferred embodiment of this invention, one or more of the above organotin compounds is incorporated into paint and wood stain vehicles, preferably those having an oil, epoxy resin, or latex film-forming base, or "carrier," and applied concurrently with the paint or stain. For example, 5 g. of (phenylsulfonylmethyl)tributyltin is dissolved in about 1 oz. of mineral spirits and is added to 1 gallon of a commercial oil base paint. The paint is applied to wooden pier pilings and provides anti-fouling and wood preservative benefits by virtue of the organotin compound. The organotin compound does not substantially alter the color of the paint or stain the painted surface.

The organotin compounds of the types hereinabove disclosed are compatible with other preservatives and antifouling materials can be applied to surfaces in conjunction therewith. For example, (phenylsulfonylmethyl)tributyltin can be admixed with FCAP to provide an effective wood preservative composition which is repellent to salt water and fresh water mollusks and is substantially termite-proof.

The anti-fouling and wood preservative compositions of the present invention comprise from about 0.1 percent to about 40 percent by weight, more preferaably about 1 percent to about 10 percent by weight, of the organotin compound and about 60 percent to about 99.9 percent by weight of a film-forming carrier (see above). Up to about 70 percent by weight of various common paint pigments can also be used in such compositions. These compositions are applied to the surfaces being treated by any of the above-disclosed methods to deposit an effective amount of the organotin compound, i.e., from about 0.01 g. to about 10 g., more preferably from about 0.1 g. to about 1 g., per square meter of surface area onto and into the surface. Surfaces so treated remain free from bacteria, rodents, mollusks, algae, bryozoans, oysters, barnacles and and other encrusting marine organisms, various insects, specially termites; wood so treated is also protected from decay caused by brown rot fungi such as *Lenzites trabea* Pers. ex Fr. — Madison isolate No. 617.

The following examples are intended to illustrate the compositions and processes of this invention but are not intended to be limiting thereof. The organotin compounds used in the following processes and compositions are prepared in the manner of Peterson, above.

EXAMPLE I

Loblolly pine sap wood was selected as a test substrate. A vigorous brown-rot fungus (*L. trabea*) was used as a test fungus. The test was performed according to the "Soil-Block Method" of the American Society for Testing and Materials Standard. Replicate sets of five blocks were treated with nine different concentrations of the organotin preservative in three separate tests. The treating solutions comprised acetone solvent containing from 1.25 to 80 grams of preservative per liter. Each set of five blocks was treated "to refusal" under vacuum such that all void space within the wood was filled with the treatment solution. Solvent was allowed to evaporate at 80°F and 50 percent relative humidity. The blocks were then exposed to the test fungus for a standard period of 12 weeks under conditions which allowed rapid decay of the wood. The incubation temperature of the blocks was 30°C. The amount of decay was assessed by comparing the weight of the treated blocks with untreated blocks and a "threshold value" for the organotin compound as a wood preservative was established.

In the above test, (methylthiomethyl)tributyltin was found to have a threshold wood protective value of 240 p.p.m. This compares quite favorably with arsenic and mercury wood preservatives.

In the above procedure, the (methylthiomethyl)-tributyltin is replaced by an equivalent amount of (phenylsulfonylmethyl)tributyltin, and (N,N-dimethylaminomethyl)-tributyltin, respectively, and equivalent wood protection is noted.

In the above procedure, the acetone solvent is replaced by an equivalent amount of chlorobenzene, kerosene, petroleum ether, linseed oil and turpentine, respectively, and equivalent results are secured.

EXAMPLE II

A composition comprisng 10 percent by weight of (p-henyl-sulfonylmethyl)tributyltin in 90 g. of trichloroethylene is brushed onto oak at a rate of about 15 g./M². The treated oak is repellent to rats and is not substantially damaged by termites.

In the above procedure, the (phenylsulfonylmethyl)-tributyltin is replaced by an equivalent amount of (phenylsulfonylmethyl)tridecyltin, (methylsulfonylmethyl)-tributyltin, and (N,N-dimethylaminomethyl)tributyltin, respectively, and equivalent results are secured.

Wood treated in the foregoing manner is painted with oil and water base paints, respectively, and does not substantially discolor or stain the paint.

EXAMPLE III

A composition comprising 25 percent by weight of (N,N-dimethylaminomethyl)tributyltin dissolved in a naphtha distillate is sprayed onto maple lumber at a rate of about 1 Oz. per square meter. The treated maple lumber is not substantially damaged by soil bacteria and soil fungi of the genus Fusarium.

In the above procedure the (N,N-dimethylaminomethyl)-tributyltin is replaced by an equivalent amount of (phenylthiomethyl)tributylin, (decylthiomethyl)tributyltin, (methylthiomethyl)tributyltin, (naphthylsulfonylmethyl)tridecyltin, (cyclopentamethylenaminomethyl)tributyltin, and (N,N-diethylaminomethyl)tri(3-pentenyl)tin, respectively, and equivalent wood protection is secured.

EXAMPLE IV

An anti-fouling ship's paint formulation corresponding substantially to MIL-P-22299, as published in "Guide to U.S. Government Paint Specifications" sixteenth ed., National Paint, Varnish and Lacquer Association, Washington, D.C., supplement June 11, 1965, is prepared having the following composition:

| Ingredient | Parts By Weight |
| --- | --- |
| (methylthiomethyl)tributyltin | 200 |
| rosin | 32 |
| polyisobutylene polymer | 45 |
| xylene | 864 |
| Deenax* | 0.05 |

*Inhibitor

The above composition is brushed onto concrete, steel and aluminum plate at a rate of about 1 gallon per 500 square feet; the coated surfaces are allowed to dry and are then immersed in ocean water. Upon retrieval, the coated surfaces are substantially free from barnacles, encrusting bryozoans, algae, begula, hydroids, oysters, tube worms, tunicates, and microorganism slime film.

EXAMPLE V

An anti-fouling vinyl paint composition corresponding substantially to the specifications for MIL-p-15931 B(see specification list, above) is prepared as follows:

| Ingredient | Parts By Weight |
| --- | --- |
| (phenylsulfonylmethyl)tributyltin | 500 |
| rosin | 415 |
| vinyl resin | 150 |
| tricresyl phosphate | 100 |
| methyl isobutyl ketone | 400 |
| xylene | 350 |
| fumed silica (anti-settling agent) | 5 to 9 |

The above composition is sprayed onto aluminum ship bottoms and prevents the adhesion of barnacles, encrusting bryozoans, oysters, tunicates and microorganism slime films thereon when the said ship bottoms are immersed in sea water.

EXAMPLE VI

An anti-fouling paint composition corresponding substantially to Federal Specification 52-MA-403c is prepared as follows:

| Ingredient | Parts By Weight |
| --- | --- |
| (N,N-dimethylaminomethyl)tributyltin | 270 |
| Indian Red | 100 |
| magnesium silicate | 100 |
| rosin WW | 330 |
| pine oil | 52 |
| coal tar (based on 80% non-volatile) | 105 |
| high flash naphtha | 175 |
| mineral spirits | 175 |

The above composition is applied to wooden pier pilings and steel lobster pots and prevents the adhesion of substantially all forms of marine life thereto.

In the above composition, the (N,N-dimethylaminomethyl)tributyltin is replaced with an equivalent amount of (p-chlorophenylsulfonylmethyl)tributyltin, (o-tolylsufonylmethyl)tributyltin, (phenanthrylsulfonylmethyl)tributyltin, (o-bromophenylsulfonylmethyl)triphenyltin, (N,N-diethylaminosulfonylmethyl)tributyltin, (N,N-dihexylaminosulfonylmethyl)tridecyltin, (N,N-diethylaminomethyl)triisopropyltin, (N,N-didodecylaminomethyl)trihexyltin, (decylthiomethyl)tributyltin, (phenylthiomethyl)tributyltin, (methylthiomethyl)trimethyltin, and (P-chlorophenylthiomethyl)tributyltin, respectively, and equivalent results are secured.

EXAMPLE VII

An anti-fouling, self-curing epoxy paint composition is prepared by blending the following materials.

| Ingredient | Percent by Weight |
| --- | --- |
| epoxy resin* | 18 |
| butyl glycidyl ether (solvent) | 60 |
| dibutyl phthalate (plasticizer) | 2 |
| xylene | 5 |
| (methylthiomethyl)tributyltin | 10 |
| aluminum oxide | 5 |

*High molecular weight bisphenol-A/epichlorohydrin condensate.

The above composition is applied to steel and steel alloy ship bottoms and prevents the accumulation of all manner of marine life thereon.

In the above composition, the (methylthiomethyl)tributyltin is replaced by an equivalent amount of (methylthiomethyl)triethyltin, (β-fluoronaphthylsulfonylmethyl)tributyltin and (ethylthiomethyl)triphenyltin, respectively, and equivalent results are secured.

EXAMPLE VIII

An amine-cured epoxy paint composition is prepared as follows:

| Ingredient | Percent by Weight |
| --- | --- |
| epoxy ester* | 20 |
| butyl glycidyl ether | 60 |
| dibutyl phthalate | 2 |
| (phenylsulfonylmethyl)tributyltin | 18 |

*bisphenol-A/epichlorohydrin condensate - low molecular weight.

Triethylenetetramine comprises the separately packaged curing agent for the above composition. Immediately prior to use, the triethylenetetramine is admixed with the foregoing composition at a ratio of about 1 oz. of triethylenetetramine per gallon of said composition and the coating is immediately applied to the surface. Steel, aluminum, fiberglass, concrete and wooden surfaces so treated remain substantially free from all manner of encrusting marine microorganisms.

In the above composition, the (phenylsulfonylmethyl)-tributyltin is replaced by an equivalent amount of (N,N-dimethylaminomethyl)tributyltin, (phenylthiomethyl)-tributyltin, (methylthiomethyl)tributyltin, and (phenylsulfonylmethyl)tributyltin, respectively, and equivalent results are secured.

EXAMPLE IX

A composition comprising 10 pounds of (methylthiomethyl)tributyltin dissolved in 100 pounds of a 1:1 (wt.) mixture of high flash naphtha and methyl isobutyl ketone containing 0.5 pound of tricresyl phosphate is sprayed onto a galvanized ship bottom encrusted with barnacles, bryozoans, algae and microorganism slime film. The spray rate is set at about 1 gallon per 200 square feet. After allowing the solvent to evaporate, the organisms are no longer substantially viable. The ship bottom is scraped and the encrustations are found to be more readily removed than when the viable organisms are removed by scraping.

In the above process, the (methylthiomethyl)tributyltin is replaced by an equivalent amount of (N,N-dimethylaminosulfonylmethyl)tri-β-nitronaphthyltin, (N,N,dihexylaminosulfonylmethyl)tri-p-tolyltin, (β-methoxynaphthylthiomethyl)triphenyltin, (p-trichloromethylphenylsulfonylmethyl)tri-p-chlorophenyltin, (β-fluoronaphthylthiomethyl)-trioctyltin, (4-hydroxyphenanthrylthiomethyl)triisopropyltin, and (cyclohexylthiomethyl)tributyltin, respectively, and equivalent results are secured.

The following test compares the anti-fouling effectiveness of the compounds herein with tributyltin oxide, a widely used marine anti-fouling compound. In the test, representative organotin compounds of the types disclosed above were dissolved in a suitable organic solvent, e.g., acetone, and measured amounts coated onto silicate blocks. The blocks were immersed in the ocean at various depths for various time periods. Following this the blocks were retrieved and the degree of marine growth and adhesion, i.e., the "fouling" of the blocks, was estimated visually. In this test $CH_3SCH_2Sn(C_4H_9)_3$, $(C_4H_9)_3SnCH_2N(CH_3)_2$ and $C_6H_5SO_2CH_2SnBu_3$, were equal to substantially better than the tributyltin oxide for preventing the adhesion of barnacles, encrusting bryozoans, algae, begula, hydroids, oysters, tube worms, tunicates and microorganism slime films. The compounds (methylthiomethyl)tributyltin and (phenylsulfonylmethyl)tributyltin were especially effective in the test.

What is claimed is:

1. An antifouling and wood preservative composition comprising:
   1. from about 0.1 percent to about 40 percent by weight of an organotin compound selected from the group consisting of (organothiomethyl) triorganotin, (organosulfonylmethyl)triorganotin, and (N,N-disubstituted aminomethyl)triorganotin compounds; and
   2. from about 60 percent to about 99.9 percent by weight of a film-forming carrier selected from the group consisting of trichloroethylene, chlorobenzene, propylene chloride, benzene, toluene, xylene, hexane, decane, and mixtures thereof, dehydrogenated soybean oil, linseed oil, rapeseed oil, tung oil, epoxy resin paint bases, and latex paint bases.

2. A composition according to claim 1 wherein the organotin compound is selected from the group consisting of (phenylsulfonylmethyl)tributyltin, (methylthiomethyl)tributyltin, (phenylthiomethyl)tributyltin and (N,N-dimethylaminomethyl)tributyltin.

* * * * *